Figure 1:
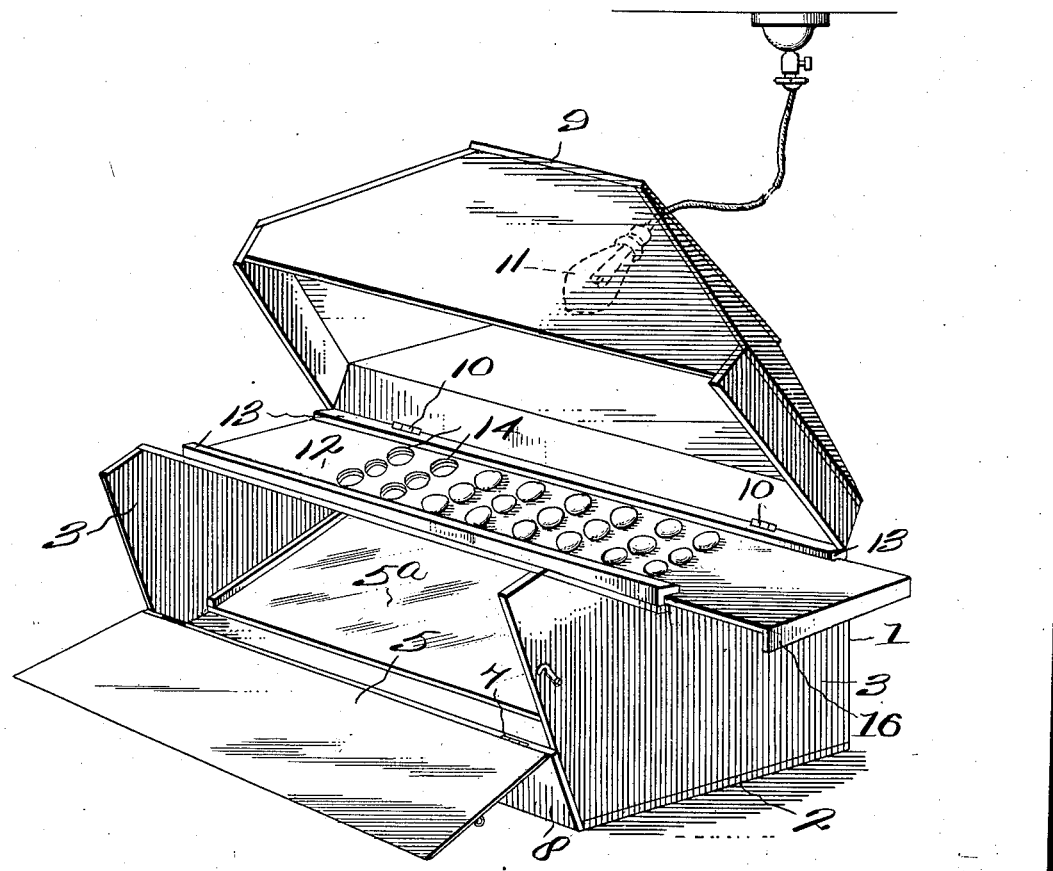

O. J. KOGEL & W. T. SIMMONS.
EGG TESTER.
APPLICATION FILED SEPT. 12, 1913.

1,091,353.

Patented Mar. 24, 1914.
2 SHEETS—SHEET 1.

Witnesses
L. W. Helmuth.
Edwin J. Beller.

Inventors
Oscar J. Kogel.
W. T. Simmons.
by Wilkinson, Fisher, & Mackay
Attorneys.

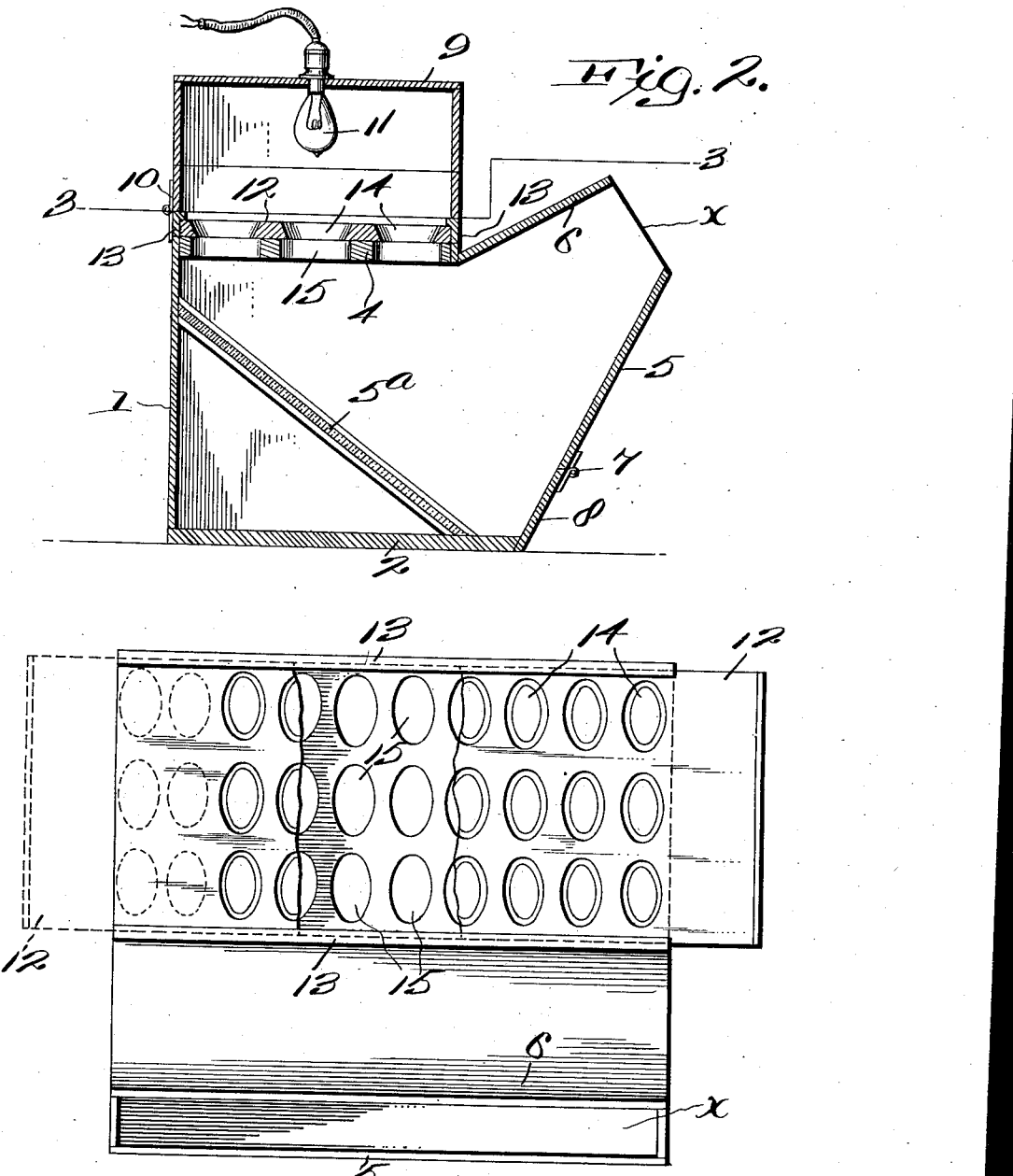

UNITED STATES PATENT OFFICE.

OSCAR J. KOGEL AND WILLIAM T. SIMMONS, OF LOUISVILLE, KENTUCKY.

EGG-TESTER.

1,091,353.

Specification of Letters Patent. Patented Mar. 24, 1914.

Application filed September 12, 1913. Serial No. 789,525.

*To all whom it may concern:*

Be it known that we, OSCAR J. KOGEL and WILLIAM T. SIMMONS, citizens of the United States, residing at Louisville, in the county of Jefferson and State of Kentucky, have invented certain new and useful Improvements in Egg-Testers; and we do hereby declare the following to be a full, clear, and exact description of the invention, such as will enable others skilled in the art to which it appertains to make and use the same.

The present invention relates to apparatus for testing or "candling" eggs, and has for its purpose to provide an egg tester wherein a plurality of eggs may be inspected at the same time for ascertaining their condition, and wherein large quantities of eggs may be accurately examined within a comparatively short period.

The invention has for its further purpose to provide an apparatus of the character in question adapted for use with natural or artificial light; and one wherein the several eggs under examination may be simultaneously turned or changed, to the end of examining the same on all sides.

In the accompanying drawings forming a part of this application, and in which similar reference symbols indicate corresponding parts in the several views:—Figure 1 is a perspective view of the apparatus, and showing the same in open position; Fig. 2 is a transverse sectional view of the egg tester; and Fig. 3 is a top plan sectional view taken on the line 3—3 of Fig. 2.

Referring to the construction in further detail, the apparatus consists of a suitable casing constructed of wood, or other appropriate material, and having a back 1, base 2, end sections 3, and a top section 4. The front is constructed of a pair of angularly-disposed sections 5 and 6 suitably spaced from each other to provide an opening X through which the eggs to be tested may be examined. The front section 5 is hinged at 7 to the strip 8, for affording access to the interior of the casing, as will be understood, (see Fig. 1). A hood, or cover, 9 is hinged, as at 10, to the back 1 of the casing, and is adapted to provide an inclosure for the lamp 11 when the apparatus is being used with artificial light. The cover, or hood, 9 is at all times ready to be raised or lowered, to the end that the tester will always be ready for instant use with either artificial or natural light.

The means for supporting the eggs consists of a tray 12, which is mounted to slide on the grate 4 through the medium of a pair of strips 13 forming guideways, as illustrated in Figs. 1 and 2. The tray 12 is formed with a plurality of elliptical apertures 14, that are adapted to hold the eggs in register with similarly-formed apertures 15 formed in the grate 4. The apertures 14 and 15 of the tray and grate, respectively, are arranged in uniformly-spaced series, and there are two more of such series in the grate 4 than in the tray 12, to the end that the eggs which are carried by the grate may be rolled or turned for inspection on different sides. Thus, when the tray is moved the distance of one row of apertures the carried eggs will have to be turned one quarter revolution, and on moving the tray the next row of apertures, the eggs will be turned another quarter revolution, thus permitting the same to be examined from opposite sides.

A reflector consisting of a mirror $5^a$ is located beneath the top section, or grate 4, and is disposed at an angle of substantially 45° whereby the "candled" eggs may be accurately reflected for inspection through the opening X.

The tray 12 projects beyond the end of the grate, as shown in Fig. 3, to the end that the same may be conveniently engaged by the hand for moving the same for the purpose above mentioned. And at either end said tray is provided with a ledge, or flange, 16 for limiting the sliding movement of the tray, as will be understood.

From the foregoing, it will be readily seen that great quantities of eggs may be accurately examined at the same time, and that the eggs may be readily inserted and removed in a convenient manner, thus commending the apparatus as an appropriate article for the use of those who handle eggs kept in cold storage.

We have illustrated and described preferred and satisfactory constructions, but changes could be made within the spirit and scope of our invention.

We claim:—

1. In an egg testing apparatus, the combination of a casing constructed to admit light; a horizontally-disposed grate mounted on the casing; guideways mounted on said grate; a tray fitting within said guideways and slidably mounted on said grate, said tray adapted to hold the eggs for inspection above the grate openings; and a diagonally-disposed reflector mounted in the casing beneath the grate, and said casing provided with an inspection aperture disposed in front of said reflector, substantially as described.

2. In an egg testing apparatus, the combination of a casing; a grate mounted on the casing; an egg supporting tray slidably mounted on said grate; a hood hingedly mounted on said casing and adapted to form an inclosure for a lamp, said hood adapted to be opened to admit natural light; and a diagonally-disposed mirror mounted in the casing beneath said grate, and said casing provided with an inspection aperture disposed in front of said mirror, substantially as described.

3. In an egg testing apparatus, the combination of a casing; a grate mounted on said casing; guideways mounted on the grate; an apertured egg supporting tray mounted to slide within said grate guideways and projecting beyond said grate, whereby to be manipulated; members mounted on the tray for limiting the sliding movement thereof; a hood mounted on the casing above the tray providing a chamber for a lamp; and a diagonally-disposed mirror mounted in the casing beneath the grate, and said casing provided with an inspection aperture disposed in front of said mirror, substantially as described.

In testimony whereof, we affix our signatures, in presence of two witnesses.

OSCAR J. KOGEL.
WILLIAM T. SIMMONS.

Witnesses:
H. C. HIGBEE,
A. D. JETT.

---

Copies of this patent may be obtained for five cents each, by addressing the "Commissioner of Patents, Washington, D. C."